United States Patent
Murali

(10) Patent No.: US 9,742,412 B1
(45) Date of Patent: Aug. 22, 2017

(54) LOW POWER WIRELESS RECEIVER FOR CONGESTED NETWORKS OPERATING WITH BEACON FRAMES

(71) Applicant: Partha Sarathy Murali, San Jose, CA (US)

(72) Inventor: Partha Sarathy Murali, San Jose, CA (US)

(73) Assignee: Redpine Signals, Inc., San Jose, CA (US)

( * ) Notice: Subject to any disclaimer, the term of this patent is extended or adjusted under 35 U.S.C. 154(b) by 266 days.

(21) Appl. No.: 14/721,965

(22) Filed: May 26, 2015

(51) Int. Cl.
  *G08C 17/00* (2006.01)
  *H03L 7/08* (2006.01)
  *H04W 52/02* (2009.01)

(52) U.S. Cl.
  CPC ....... *H03L 7/0802* (2013.01); *H04W 52/0229* (2013.01)

(58) Field of Classification Search
  None
  See application file for complete search history.

(56) References Cited

U.S. PATENT DOCUMENTS

| 7,151,759 B1 * | 12/2006 | Ryan | H03G 3/3078 370/328 |
| 2014/0112224 A1 * | 4/2014 | Jafarian | H04W 52/0209 370/311 |

* cited by examiner

*Primary Examiner* — Kenny Lin
(74) *Attorney, Agent, or Firm* — File EE Patents.com; Jay A. Chesavage

(57) ABSTRACT

A wireless receiver has a preamble detection apparatus and method which waits until the expected arrival of a beacon frame, after which power is cyclically applied during a preamble detection interval and a sleep interval until a preamble is detected. During the preamble detection interval, power is applied to receiver components, and during the sleep interval, power is not applied. The duration of the preamble detection interval is equal to a preamble sensing interval, and if a preamble is detected, power remains applied to a preamble processor for a preamble processing interval. The duration of the sleep interval is the duration of a long preamble less the sum of two times the preamble detection interval plus the preamble processing interval. Phase lock loop (PLL) power is applied a PLL settling time prior to and during the preamble detection interval.

17 Claims, 5 Drawing Sheets

Receiver Preamble Detection sequence

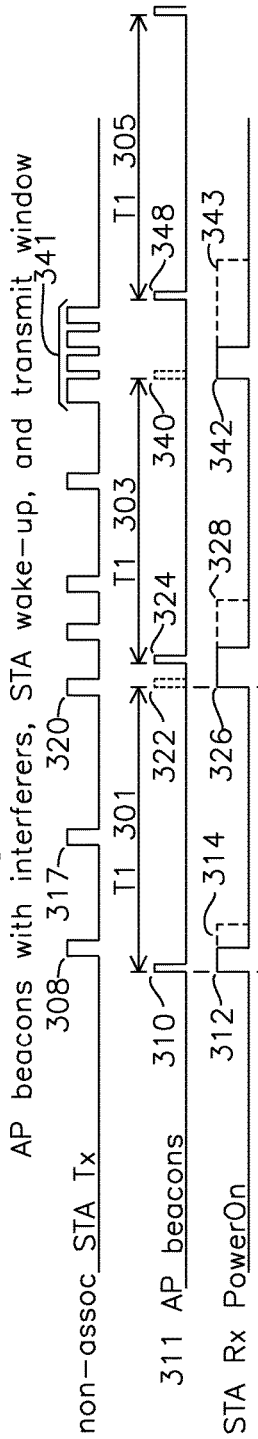

Earliest possible detection

Latest possible detection

Beacon Detect Process

LOW POWER WIRELESS RECEIVER FOR CONGESTED NETWORKS OPERATING WITH BEACON FRAMES

FIELD OF THE INVENTION

The present invention relates to an apparatus and method for low power wireless receiver operation in a receiver which is in a power-down mode but which periodically wakes up to respond to periodic beacons which define available receive or transmit intervals.

BACKGROUND OF THE INVENTION

Under the IEEE Standard 802.11, wireless stations (STA) and access points (AP) may operate in an infrastructure mode. Infrastructure mode defines a set of communication protocols, one of which is an association protocol for a station to join an access point, another of which provides for an access point which operates continuously to periodically communicate with a station which has the characteristic of being in a power-down (sleep) mode, where the station periodically is activated into a power-up (wake-up) state to receive a Delivery Traffic Indication Map (DTIM) which indicates whether there are packets to be transmitted to the newly-awakened station. This power-saver protocol conserves a significant amount of power by only consuming power when in the power-up state (the interval when power is applied to the receiver circuits) shortly prior to the expected arrival of a beacon frame, and where the power-up state occurs during defined intervals related to periodic beacon intervals. In one example prior art embodiment, the wireless AP transmits a frame known as Delivery Traffic Indication Map (DTIM) and the STA responds indicating how often the station will wakeup to check the beacon frame to receive or transmit to the AP. According to the 802.11 power-saver protocol for stations, the station is in a power-up state shortly prior to the expected arrival of the AP beacon frame, and the STA stays powered on long enough during this interval to determine whether the traffic map of the beacon frame indicates there are receive packets destined to the AP, and if so, the station STA remains in a power-up state until the packets are received.

A problem arises in congested networks, where the STA may wake up at the appointed beacon interval, but the beacon frame is delayed in transmission because of network congestion (such as from an associated station transmitting, or a station or other access point on the same WLAN channel is nearby and interfering), in which case the AP waits for a clear channel before transmitting. During either of these disruptions, the STA remains powered up and awaiting reception of the delayed WLAN beacon frame, causing unwanted power consumption. It is desired to provide a power saving apparatus and method which provides improved power savings in a station operative in congested networks where the station wakes up and the expected beacon is delayed because of network congestion or interferers.

OBJECTS OF THE INVENTION

A first object of the invention is an apparatus and method for reduced power consumption in periodic power-up of a wireless station at a beacon wakeup time for reception of a beacon frame, whereby:

upon the expected arrival of a beacon frame, the station enters into a repetitive series of preamble detect cycles, each preamble detect cycle comprising a preamble detection interval followed by a sleep interval;

where power is applied to a phase lock loop (PLL) a PLL settling time prior to each preamble detection interval and also throughout the preamble detection interval;

each preamble detection interval having a duration substantially equal to a preamble sensing time sufficient to detect a preamble and assert a preamble detect signal;

each sleep interval having a duration equal to a preamble duration minus the sum of two times the preamble detection interval plus a preamble processing interval;

where power is applied to a preamble detector during the preamble sensing interval and when a preamble is present, power remains applied to the preamble detector and also a preamble processor;

and where power is removed from the PLL, preamble detector, and preamble processor during the sleep interval.

A second object of the invention is a process for power-up of a wireless receiver receiving beacon frames operative on a receiver having RF components, PLL components, a preamble detector, and a preamble processor, the PLL components having a settling time, the preamble detector having a preamble sensing interval, and the preamble processor having a preamble processing interval, the process comprising:

identifying an expected preamble arrival time;

repetitively cycling power on during a preamble detection interval and off during a sleep interval, where during the preamble detection interval power is applied to the RF components and preamble detector, and where during the sleep interval, power is removed from the RF components and preamble detector;

and where power to the PLL components is applied a PLL settling time prior to the preamble detection interval and also throughout the preamble detection interval, and power to the PLL components is removed during the sleep interval;

the preamble detection interval comprising an preamble sensing time;

the sleep interval being substantially equal to a preamble duration less two times the preamble detection interval and less a preamble processing time;

and where a preamble processor is powered during the preamble detection interval and is also powered during the preamble processing time if a preamble is sensed.

A third object of the invention is a process for detection of a preamble of a beacon frame, the process comprising:

identifying an expected beacon frame arrival time;

a preamble search step where power is repetitively applied to PLL components a PLL settling time prior to the preamble detection interval and during the preamble detection interval and power is applied to RF components, preamble detector components, and preamble processor components during the preamble detection interval and then removed from the PLL components, RF components, preamble detector components and preamble processor components during a sleep interval which follows the preamble detection interval;

and where the sleep interval is equal to a preamble duration less the sum of two times the preamble detection interval and a preamble processing interval;

and where, upon detection of a preamble for a beacon frame, power remains applied to the PLL components, RF components, packet detection components and preamble processor until the end of the beacon frame.

SUMMARY OF THE INVENTION

A wireless station receives beacon frames at periodic intervals from which an expected beacon arrival may be determined. A series of preamble detection cycles is initiated until a preamble is detected, each preamble detection cycle comprising a preamble detection interval followed by a sleep interval. Power is applied to phase locked loop (PLL) clock distribution A PLL settling time prior to each preamble detection interval and throughout the preamble detection interval. Power is applied to a receiver and preamble detector during the preamble detection interval, and power is removed from the receiver, preamble detector, and PLL during the sleep interval. The receiver includes RF circuits which receive and amplify the wireless packet, convert the packet to a baseband series of symbols using a local oscillator, and present the symbol stream to a preamble detector for detection of a preamble and subsequently to a preamble processor for extraction of preamble characteristics if a preamble is detected. The duration of the preamble detection interval is equal to a preamble sensing interval, and the duration of the sleep interval is equal to the duration of a preamble less the sum of twice the duration of the preamble detection interval plus the duration of the preamble processing interval.

A method for a wireless station has a first step of listening for a wireless packet using a receiver and preamble detector, whereby only the receiver and preamble detector are cyclically powered up for a first interval and powered down for a second interval, the first interval substantially equal to the duration of a preamble sensing interval which is substantially equal to the time required for the receiver to reach an operational state after application of power, to perform AGC operations, and to detect the presence of a preamble. If a preamble is detected, power remains applied to the preamble detector and also to a preamble processor which extracts parameters required by a baseband processor for demodulation of the packet. The duration of the preamble sensing interval and preamble processing intervals are specific to the particular preamble sensing and preamble processing methods used. The second interval is substantially equal to the duration of a wireless packet preamble less the sum of two times the first interval plus the duration of a wireless preamble processing interval.

BRIEF DESCRIPTION OF THE DRAWINGS

FIG. 3 is a timing diagram for a station operating in infrastructure mode with an access point with wireless interferers.

FIG. 4A is a diagram showing the fields of an 802.11 Wireless Local Area Network (WLAN) packet with a long preamble.

FIG. 4B is a diagram showing the fields of a WLAN packet with a short preamble.

DETAILED DESCRIPTION OF THE INVENTION

Figure 1:
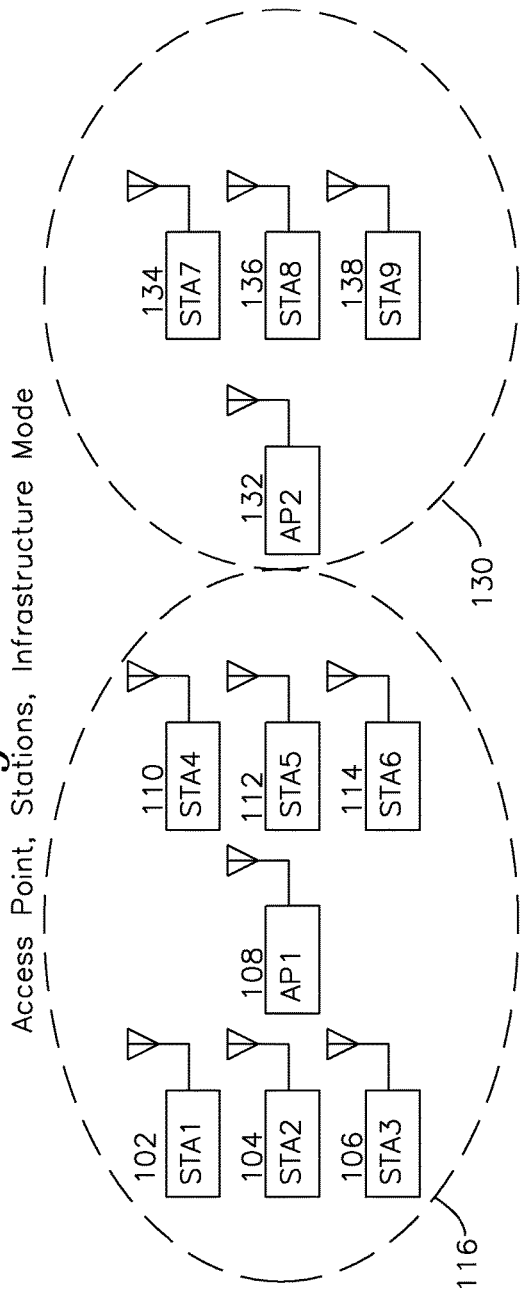
FIG. 1 shows a block diagram of access points and associated stations in an infrastructure mode.

The present invention is operative in wireless local area networks (WLAN) operative using 802.11, which are understood to be wireless networks which are compatible with or interoperable with the IEEE 802.11-2012 and predecessor 802.11 standards.

Applicant identifies the following terminology for use in understanding the invention:

A receiver is understood to be any electronic circuitry which can be energized into a power-on state or de-energized into a power-down state for receiving wireless packets and amplifying them. The receiver may include automatic gain control (AGC) operations and the assertion of a preamble detect output as part of preamble sensing. When a preamble is detected, preamble processing occurs which may also optionally include performing channel equalization, center frequency offset correction, and rake training prior to digitization and presentation to a baseband signal processor for demodulation of the packet which follows the preamble. Typically, the receiver also includes a pre-amplifier, a baseband mixer, low pass filters, and analog to digital converter (ADC) with an output coupled to a preamble sensor and preamble processor, and the preamble processor delivers the extracted channel equalization and frequency offset parameters to the baseband processor for demodulating the associated packet. During the preamble sensing interval, the receiver performs automatic gain control (AGC) to place the signal into a suitable dynamic range of the ADC during the preamble interval of a received packet.

A preamble detector accepts an amplified baseband wireless signal from the receiver and asserts a preamble detect output upon detection of the preamble part of the wireless packet, with signals the preamble processor to perform channel estimation which provides information about the relative phase and gain corrections to be applied to the individual subcarriers, center frequency offset, and rake training prior to the packet demodulation which is performed by the baseband processor.

Various parts of a wireless receiver may accept a variety of clock signals which are derived from a phase lock loop (PLL) oscillator, and the PLL typically has a settling time after power up before the clock signals are usable for the associated required functions.

The present apparatus and method includes determining the expected arrival of a beacon frame having a preamble, where the apparatus and method includes a preamble detection state when a WLAN packet preamble is received and a preamble detector asserts a preamble detect output in a processing time of substantially 10 us when a preamble is detected. If a preamble is detected, power remains applied to the preamble processor for substantially 28 us for preamble processing to occur, including the extraction of at least a channel estimate, center frequency offset, or rake training. If no preamble is detected, power is removed from the preamble processor and preamble detector until the subsequent preamble detection cycle occurs.

All wireless packets begin with a preamble sequence in the first segment of a wireless packet, which for a 802.11 WLAN packet is typically transmitted at a bit rate of $10^6$ bits per second (BPS), referred to as 1 MBPS, and the preamble may be "short" or "long" as described in FIGS. 4A and 4B. Short preamble frames are permitted for 802.11b, 802.11g, and 802.11n, for example, however beacon frames which are the packets of interest in the present invention must be transmitted with long preamble.

The present invention is operative using a preamble detection cycle, which consists of the cyclical presentation of a preamble detection interval followed by a sleep interval. The first preamble detection cycle is initiated when a beacon frame is expected to be received, since the beacons are transmitted by a remote access point (AP) at regular intervals known to the station. Repeating preamble detection cycles comprising a preamble detection interval followed by a sleep interval, which continue until a preamble is detected, at which point power remains applied to the receiver and PLL components through the subsequent preamble processing interval and baseband processor packet demodulation and packet header extraction until it is determined whether a packet is to be received by the STA (typically by a match between the MAC destination address field and the station MAC address), at which time power remains applied to the receiver and PLL until the packet is received, or where there is no preamble detected or the packet is not destined for the STA, and the receiver is powered off.

A PLL settling time prior to each preamble detection interval, the PLLs are powered on by the assertion of PLL_Power for a PLL settling time after which the clock signals distributed through the receiver are stable and the mixer and other components can operate successfully.

The preamble detection interval refers to the interval when power is applied to the receiver (including any required preamplifier, mixer, low pass filter, analog to digital converter (ADC), preamble detector, and baseband processor), and the sleep interval refers to the subsequent interval when power is removed from the receiver and preamble detector. During the preamble detection interval, the receiver, preamble detector, and preamble processor are powered by the signal RX_Power, and during the preamble sensing interval, the preamble detector performs AGC and detects the presence of a preamble during the preamble sensing interval. If a preamble is detected, power remains applied to a preamble processor which operates over a preamble processing interval, during which time center frequency offset, channel equalization, and rake training occur, but the preamble processing interval only occurs if a preamble detect occurs during the preamble sensing interval. Prior to the preamble detector or preamble processor becoming operational after application of power, there are several sources of initialization delay, each with a separate time constant, but these initialization delays are associated with the receiver being in an operative state to receive any incoming beacon frame preamble, which requires the clock distribution be settled and stable, which is associated with phase lock loop (PLL) settling time for a multiplied clock provided to the receiver or preamble detector after application of PLL_Power to the PLL circuits.

FIG. 1 shows wireless devices 116 operating in 802.11 WLAN infrastructure mode including access point AP1 108 and associated stations STA1 102, STA2 104, STA3 106 STA4 110, STA5 112, and STA 6 114, which are associated to the access point AP1 108 according to the WLAN association procedure of IEEE 802.11, either by passive association, where the STA joins the AP via an association request, or by an active association, whereby the STA joins the AP using a probe command, as described in 802.11. Nearby stations STA 7 134, STA8 136, STA9 138 are associated with access point AP2 132 which is also operating in an IEEE 802.11 infrastructure network 130 unrelated to infrastructure network 116.

Figure 2:
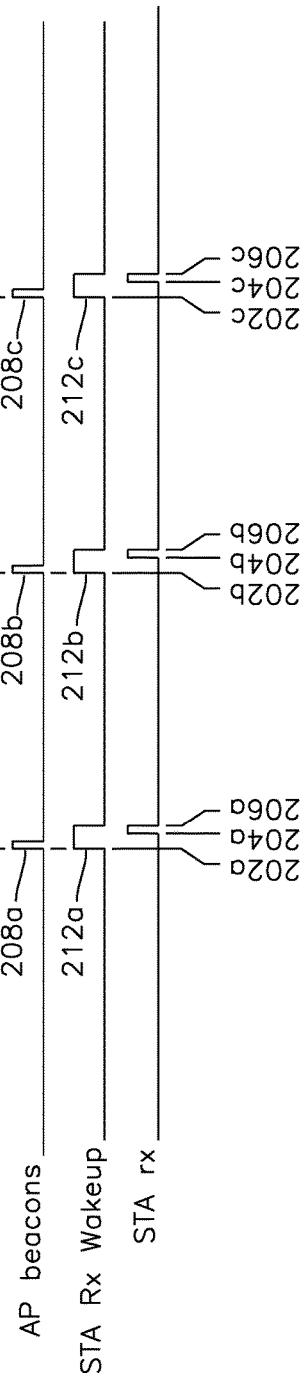
FIG. 2 is a timing diagram for a station operating in infrastructure mode with an access point.

FIG. 2 shows a timing diagram for a communications protocol of a wireless local area network access point such as FIG. 1 AP1 108 operating with an example station STA1 102. Periodic beacon frames 208a, 208b, 208c, etc are transmitted a uniform time interval T1 210 from each other. According to the IEEE 802.11 WLAN power-saver protocol, the station wakes up at intervals 212a, 212b, and 212c, and the WLAN station receives frames, and if the station STA has any frames to transmit, does so at indicated times 204a, 204b, 204c, etc. The operation of FIG. 2 provides great efficiency in power consumption, as the STA receiver uses internal circuitry to generate a wakeup signal, and it is only consuming power when powered up for transmit/receive operations. FIG. 2 shows a STIM interval of 1 (powering up once for each beacon), but the STA may elect to power up once every several beacons, as identified in the DTIM map.

Whereas FIG. 2 shows a best-case scenario without interferers or congestion, FIG. 3 shows the reduction in power-saver mode efficiency when interference from non-associated stations or an unrelated AP which operates on the same channel is present. The access point 108 sends beacon 310 of FIG. 3 with the intention of sending the next beacon 322 after interval T1 301. However, because of interference from non-associated stations 134, 136, 138 and access point 132 sharing the same channel, WLAN packet 320 is unsynchronized with AP beacons 311 since it is not part of the infrastructure of the AP generating beacons 311 of FIG. 3. Accordingly, the stations generating unrelated traffic are known as an interferers, which triggers the transmission back-off mechanism of IEEE 802.11, which delays the transmission of regular beacon 322 to time 324 to avoid interfering with the reception of WLAN packet 320. Through this back-off interval, the STA receiver is awake from the expected beacon arrival 322 until its actual arrival 324, shown as STA_Power_On 326, remains asserted during extended window 328 until the channel is clear, at which time any receive packets 332 from the AP may be received and packets transmitted by the STA. An extended delay 343 is shown to occur on the subsequent beacon 340, which is expected to occur a beacon interval T1 303 after previously transmitted beacon 324. The station takes note of the delayed beacon 340, and resets its wakeup timer to the expected arrival time of beacon 324 (with the delay T1 determined by the timestamp contained in each beacon), and asserts power-on 342, enabling all receiver circuitry in preparation for the next beacon. However, because of additional adjacent-channel interferers 341, the beacon 348 is additionally delayed, and the RX_Poweron signal 343 is also extended, during which time receiver power is being consumed, but no packet is present to receive until the end of the interval 346. During this entire extended interval 343, the station WLAN receiver circuitry remains enabled and consuming power, which is the primary problem of power saver operation in a congested network or networks with channel interferers.

FIGS. 4A and 4B show 802.11 WLAN packet frame formats. FIG. 4A shows a long preamble packet 402, which comprises, in sequence, 144 bits of preamble 404 at 1 MBPS using Differential Binary Phase Shift Keying (DBPSK) modulation, followed by 16 bits of start of frame delimiter 406, followed by 8 bits of signal 408, 8 bits of service 410, a length field 412, a CRC 414 which operates over the header, and the payload 416. Beacon and control frames are transmitted using 1 MBPS payload modulation, and these legacy packet types (in an era of modern WLAN equipment driven by higher data throughputs of 802.11b, 802.11g, and 802.11n higher throughput modulation methods) are transmitted using long preamble only, as required by the 802.11 standard. FIG. 4B shows a short preamble packet for use with higher data rate (greater than 1 MBps non-beacon frames), which was developed with the deployment of 802.11b, 802.11g, and 802.11n, where the preamble is shortened to 72 bits at 1 MBPS DBPSK, with the remainder of the WLAN fields being the same (other than modulation type for each field), as indicated by the identical identifiers as used in FIG. 4A. Since the first release of 802.11b, stations have been required to be operative with either short (56 bit) or long (128 bit) preambles.

Figure 7:
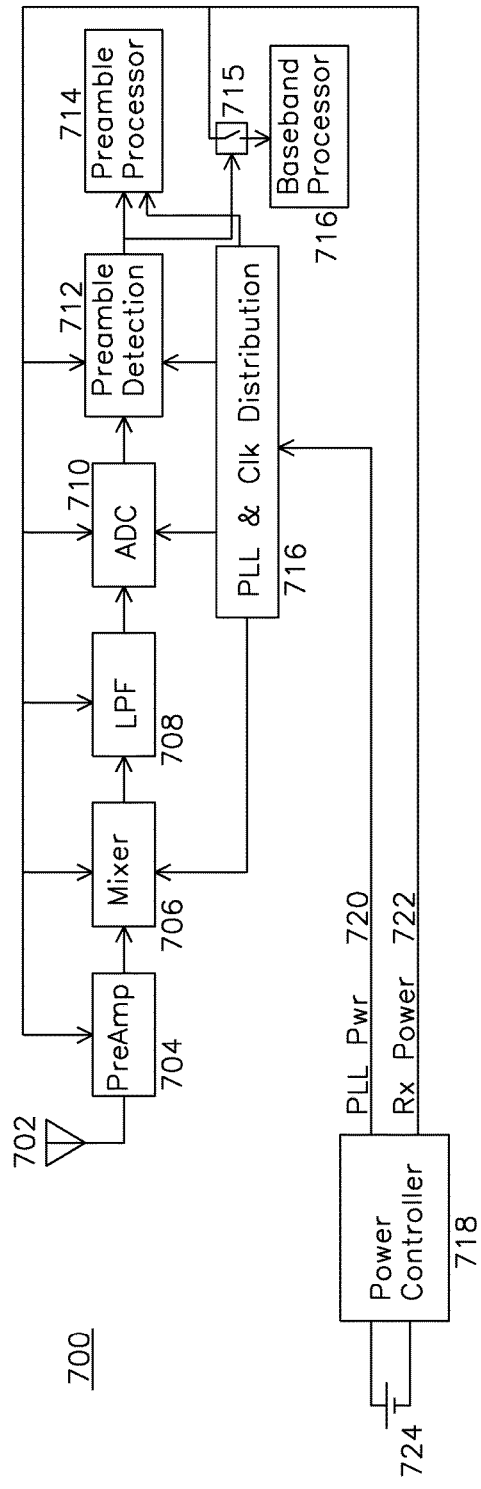
FIG. 7 shows the block diagram for a receiver and baseband processor operating according to an example of the present invention.

FIG. 7 shows the block diagram of a receiver which may be operative according to one example of the invention. Power is furnished by battery 724 where the objective is to maximize battery life through minimal power consumption. The station 700 is operative in an IEEE 802.11 infrastructure, and wakes up prior to when a beacon frame is expected to arrive. Wireless packets are received and transmitted on antenna 702, but for clarity, only the receive components of the system are shown in FIG. 7. Wireless packets received on antenna 702 are directed to a preamplifier 704 where they are amplified, passed to mixer 706 for baseband conversion, filtered by low pass filter 708, and digitized by analog to digital converter (ADC) 710, after which a preamble is detected 712 for an exemplar preamble sensing time of 10 us during which time AGC is performed and preamble detect is asserted. If preamble detect is asserted, preamble processor 714 is operative for an incremental exemplar preamble processing time of 28 us after preamble detect assertion 712, during which time channel estimation, center frequency offset, and rake training are performed, each of which is used by the baseband processor 716, which is not powered on 715 unless preamble detection occurs. If the arriving frame is a valid packet such as part of the expected beacon frame, the packet sent to a baseband processor for demodulation 714. A power controller applies power 720 to the phase lock loop (PLL) and clock distribution 716 prior to the arrival of the expected beacon frame for the clock signals to settle, and shortly afterwards, power to the remaining receiver components 722 is applied.

Figure 5A:
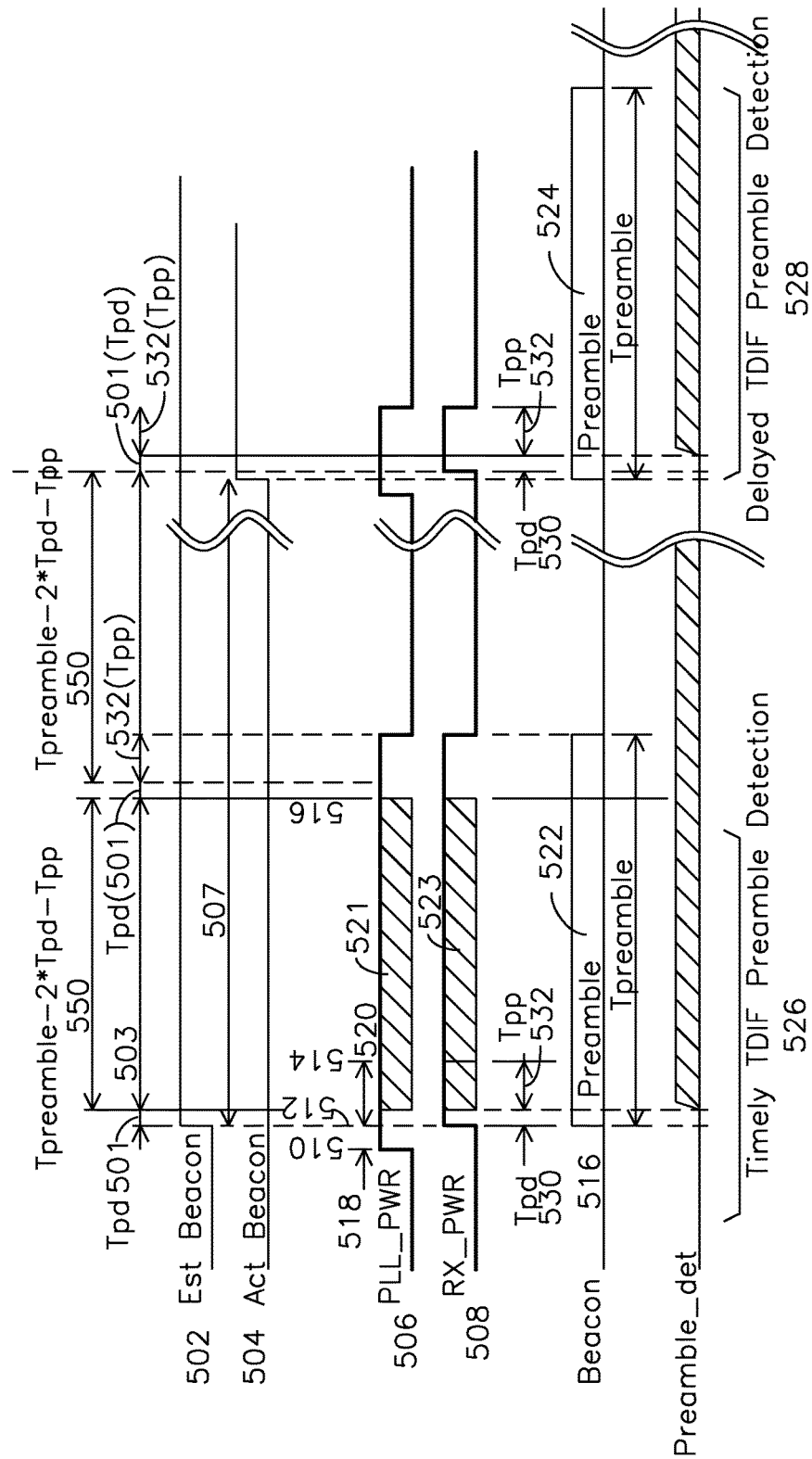
FIG. 5A is a timing diagram for a receiver preamble detection.

FIG. 5A shows the timing rationale for the receiver preamble detection apparatus and method such as the one in FIG. 7. A long preamble such as from a beacon frame will be 128 microseconds long (128 bits at 1 MBPS), each preamble prepended to a 16 bit start of frame delimiter (SFD). An exemplar preamble detector typically only requires an preamble sensing or preamble detection interval Tpd of substantially 10 microseconds to perform AGC and detect preamble, with an additional preamble processing time Tpp of 28 us to perform center frequency offset (CFO) correction, rake training, and tracking loop convergence, which provide prerequisite information used by the baseband processor to demodulate the packet and extract the payload information. As the preamble is longer than required for detection, the receiver and preamble detector may be powered on as shown by the bold line of Rx_Power 508 during the preamble detection interval 530, and if a preamble is detected, RX_Power 508 remains applied through the preamble processor interval Tpp 532. The preamble detection interval 501, which is the maximum interval of time power is applied to the receiver if no preamble is detected is equal to the preamble sensing interval Tpd. If a preamble is detected, a subsequent preamble sensing interval Tpp occurs. If preamble detect is not asserted at the end of the preamble sensing interval Tpd 530, PLL_Power and RX_Power are powered down and the sleep interval 503 follows, as shown by the hashed regions 521 and 523 for PLL_Power and Rx_Power, respectively. By careful selection of sleep interval 503 to allow two preamble detection intervals 501 plus a preamble processing interval which span the duration of the long preamble 522 of a beacon frame, and with specific knowledge of the receiver and preamble detector response time (provided as substantially 10 us in the present example) and preamble processing time (provided as substantially 28 us in the present example), if no preamble is detected during Tpd 530, it is possible to power-off the receiver during the preamble processing interval 532 and sleep interval 503, thereby assuring that a transmitted preamble from an AP beacon frame will not be missed, and the receiver need not be powered up continuously during this interval while waiting for the beacon frame to arrive. Because the reception of WLAN beacon packets is asynchronous to the Rx_Power signal 508, it is important to provide a minimum of two complete preamble detect intervals Tpd and one preamble processing intervals Tpp during a preamble 522 interval Tpreamble. Additionally, power to the PLL (PLL_Power) 506 is provided a PLL settling (Tpllsettle) time 518 prior to the preamble detection interval 501. An example Tpllsettle of 6 us is provided in the current examples for understanding the invention. The detection of a preamble enables power to the preamble processor and other components of the receiver until it is determined that a packet is to be received by the current station according to the received beacon TDIM map, or it is determined that no such packet is to be received, at which time the receiver is powered down until the next expected arrival 512 of a beacon frame.

Timely preamble detection shortly after the expected arrival of a beacon frame is shown 526, as well as delayed beacon frame packet detection 528 which occurs many preamble detect cycles after the estimate beacon arrival time 512.

Figure 6A:
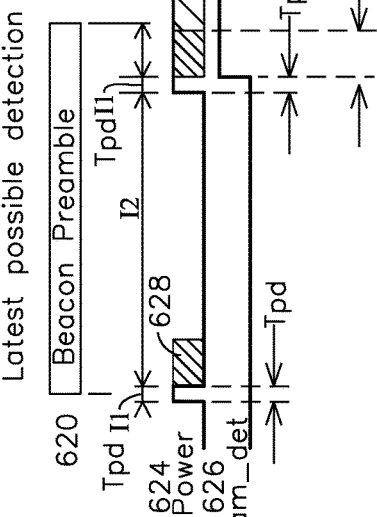
FIG. 6A is a timing diagram for early detection of a preamble.
Figure 6B:
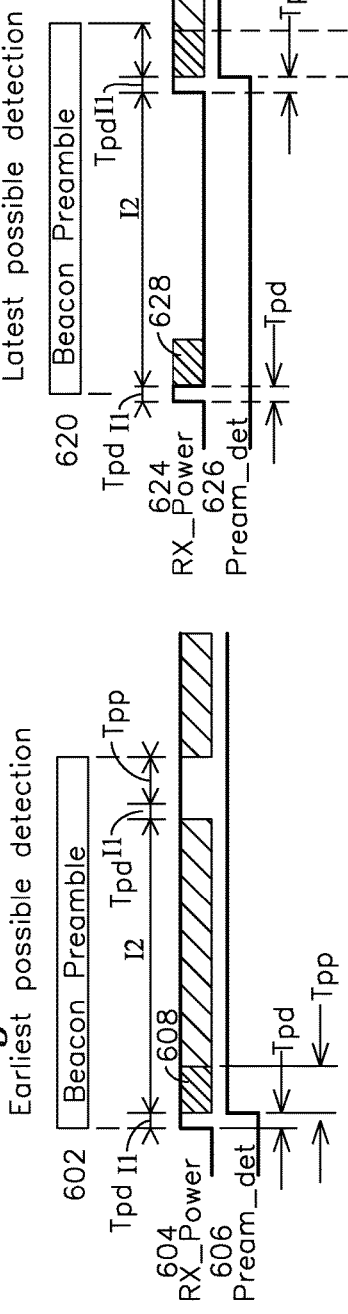
FIG. 6B is a timing diagram for late detection of a preamble.

FIG. 6A shows a timing example for the earliest possible preamble detection in a preamble detection cycle, with a preamble 602 arriving with sufficient time Tpd during the first preamble detection interval I1 to assert preamble detect 606 early in the cycle, and shows the subsequent preamble processing interval 608. FIG. 6B shows a timing example for the latest possible preamble detection of a preamble detection cycle, where the first RX_Power 624 assertion for the duration Tpd occurs too early in the preamble for preamble detect 626 to occur (and power is removed from the preamble processor during 628), but the preamble detect 626 is asserted Tpd after the second assertion of Rx_Pwron 624 during the preamble 620.

In one example embodiment of the invention, the PLL settling time 518 of FIG. 5 (governed by PLL lock time to provide a sufficiently stable clock signal for the receiver components such as mixers and ADCs to operate and sample uniformly) is 6 us representing 510 of FIG. 5A, and Tpd 530 of FIG. 5A is 10 us, and the Tpp operations of CFO, channel equalization, and preamble detection represented by 532 is 28 us, so the preamble detection interval 501 is 10 us. For a long preamble 522 of 128 us, the sleep interval 503 is 128 us−2*10 us−28 us=80 us. Since a late beacon arrival results in RX_Power only being cyclicly applied for Tpd of 10 us over the interval of Tpd of 10 us plus the sleep interval of 80 us, the power consumption of the present invention when a beacon frame arrives late is therefore 10/90=11% (less than 1/9th of the power) compared to the prior art method of leaving the receiver operative until a preamble is detected. Generally, the power savings is Tpd/(Tpd+Tsleep). Similarly, the PLL clock tree is only enabled for (Tpllsettle+

Tpd)/(Tpd+Tsleep), or 16/90=17% or less than ⅕th of the prior art for power consumed during intervals of delayed beacon frames.

Figure 8:
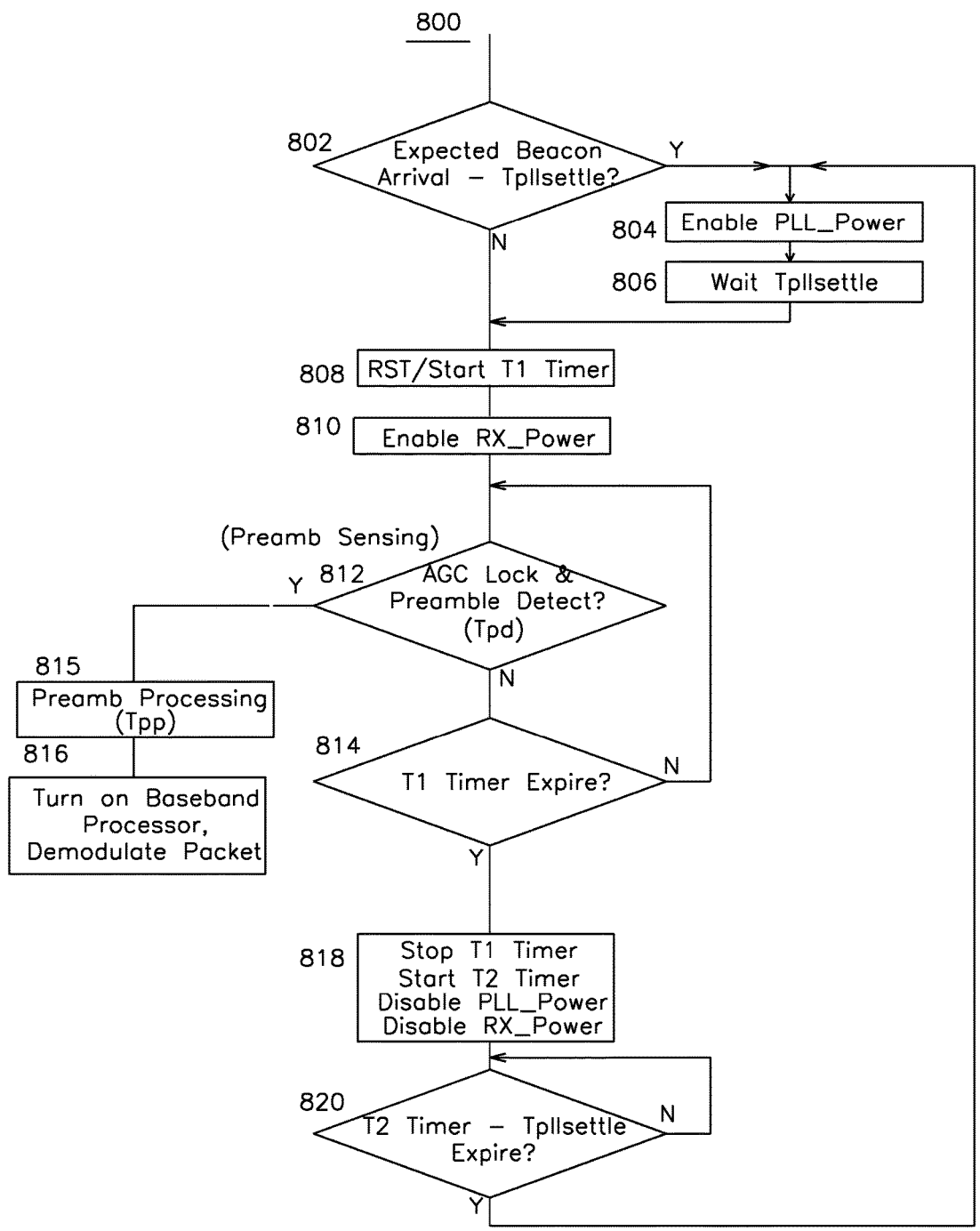
FIG. 8 shows a flowchart for a low receive power process for beacon packet detection.

FIG. 8 shows the preamble detection of beacon frames as a process 800 of the present invention. At step 802, a controller anticipates the expected arrival of a beacon by enabling PLL_Power 804 a PLL settling time Tpllsettle prior to the expected arrival of the beacon. After enabling PLL_Power 804, and waiting for PLL_Power to settle 806, a T1 timer 808 is started and RX_Power is enabled 810. A loop of checking for Preamble Detect 812 and T1 timer expiration 814 occurs until either a preamble detect is asserted leading to preamble processing 815 and packet demodulation 816, or in the case of timer T1 expiration where a preamble does not arrive during the Tpd interval, the sleep cycle of 818 and 820, during which sleep interval PLL_Power and RX_Power are removed. A PLL settling time Tpllsettle prior to the end of the sleep interval, PLL_Power 804 is enabled shortly prior to the next preamble detection cycle starting at step 808.

The examples of the present invention are shown for illustration only, and are not intended to limit the scope of the invention to only those examples described. For example, there are many different time durations associated with AGC lock, CFO estimation, channel estimation, and preamble detection. The example PLL settling time of substantially 6 us, the example packet detection which includes CFO, Rake training, channel estimation, and packet detection may be substantially 28 us each may vary by +/−50%, and accordingly the use of "substantially" with respect to a particular time duration is understood to include a variation of as much as +/−50%.

I claim:

1. A controller for a wireless local area network (WLAN) receiver, the controller generating PLL_Power for powering phase lock loop components and RX_Power for powering wireless receiver components, the controller operative during an expected beacon frame arrival time, the expected beacon frame having a preamble length;
   at the expected beacon frame arrival time, the controller cyclically operative in a preamble detection interval followed by a sleep interval until a preamble is detected;
   the preamble detection interval comprising a preamble sensing interval during which a preamble detector is operative, the RX_Power signal asserted during the preamble sensing interval and asserted during a preamble processing interval for the determination of preamble characteristics if a preamble was detected, the RX_Power signal not asserted during the sleep interval;
   the controller generating the PLL_PWR signal a PLL settling time prior to the preamble detection interval, during the preamble sensing interval, and during the preamble processing interval if a preamble was detected;
   the controller continuing to assert the RX_Power and PLL_Power signals when a preamble is detected until a packet associated with the detected preamble is received.

2. The controller of claim 1 where the PLL_Power signal is applied to clock distribution components which include a phase locked loop (PLL) having the PLL settling time.

3. The controller of claim 1 where the sleep interval is the preamble length minus the sum of two times the preamble detection interval plus the preamble processing interval.

4. The controller of claim 1 where the PLL settling time is substantially 6 us.

5. The controller of claim 1 where the preamble processing interval includes at least one of: an automatic gain control (AGC) lock time, a center frequency offset (CFO) estimation time, a channel equalization time, or a preamble detection time.

6. The controller of claim 1 where the preamble processing interval is substantially 28 us.

7. The controller of claim 1 where the preamble duration is substantially 128 us.

8. The controller of claim 1 where the sleep interval is substantially 80 us.

9. The power down controller of claim 1 where the RX_Power is applied to a receiver having at least one of: a preamplifier, a mixer, a low pass filter, an analog to digital converter, a preamble detector, a preamble processor, and a baseband processor.

10. The power down controller of claim 1 where the PLL_Power is applied to a phase lock loop clock distribution which generates clock signals coupled to at least one of a mixer, an analog to digital converter, a preamble detector, or a baseband processor.

11. A process for powering a wireless local area network (WLAN) receiver receiving beacon frames, the process operative on a WLAN receiver powered by RX_Power, the receiver receiving the wireless beacon frames at expected beacon arrival times, the receiver having phase locked loop (PLL) clocks powered by PLL_Power and having a PLL settling time, a preamble detector which has a preamble sensing time to detect a preamble of a beacon frame, a preamble processor having a preamble processing interval to extract preamble parameters, the preamble having a preamble length, the process comprising:
   a cyclical preamble detection step having a continuous sequence of a preamble detection interval and a sleep interval, the cyclical preamble detection step starting at the expected beacon arrival time, RX_Power being applied to the receiver during a preamble sensing interval within the preamble detection interval and RX_Power not being applied to the receiver during the sleep interval, and PLL_Power being applied to the phase locked loop for the PLL settling time prior to the preamble detection interval as well as during the preamble detection interval;
   a detected preamble step where the RX_Power and PLL_Power remain applied upon detection of a preamble by the preamble detector and remaining applied until a packet is received or a timeout occurs;
   where the duration of the sleep interval is substantially equal to the preamble length minus the sum of two times the preamble detection interval plus the preamble processing interval.

12. The process of claim 11 where the PLL settling time is substantially 6 us.

13. The process of claim 11 where the preamble sensing interval includes an automatic gain control (AGC) lock time, and the preamble processing interval includes at least one of: performing a center frequency offset (CFO) estimation, performing a channel estimation, or performing a rake training operation.

14. The process of claim 11 where the preamble detection interval is substantially 10 us.

15. The process of claim 11 where the preamble has a duration of substantially 128 us.

16. The process of claim 11 where the sleep interval is substantially 80 us.

17. The process of claim 11 where the preamble detection step continues when a packet which is not a beacon frame is received.

\* \* \* \* \*